United States Patent [19]

Pasley

[11] Patent Number: 4,483,133
[45] Date of Patent: Nov. 20, 1984

[54] WORK IMPLEMENT

[75] Inventor: Harry M. Pasley, Fresno, Calif.

[73] Assignee: Chilucaley Co., Fresno, Calif.

[21] Appl. No.: 485,705

[22] Filed: Apr. 18, 1983

[51] Int. Cl.³ .......................... A01D 7/10; A01B 1/20
[52] U.S. Cl. ............................. 56/400.06; 56/400.17;
                        172/372; 172/375; 172/377; 172/378
[58] Field of Search .............. 172/371, 372, 373, 374,
                    172/375, 376, 377, 378; 56/400.06, 400.17,
                                400.18; 30/162, 335; 15/DIG. 5

[56] References Cited

U.S. PATENT DOCUMENTS

| 1,167,491 | 1/1916 | Gilson, Sr. ............... 172/376 X |
| 1,574,665 | 2/1926 | Lovin ............................ 30/336 |
| 2,147,980 | 2/1939 | Koenig ........................ 172/376 |
| 2,794,312 | 6/1957 | Finkes ...................... 56/400.17 |
| 2,943,690 | 7/1960 | Towt .............................. 172/376 |
| 3,171,201 | 3/1965 | Carifi .............................. 30/335 |
| 3,965,991 | 6/1976 | Eads et al. ..................... 172/376 |
| 4,212,150 | 7/1980 | Dmochowski .................. 56/400 |

FOREIGN PATENT DOCUMENTS

| 472210 | 11/1974 | Australia ...................... 172/377 |
| 87093 | 8/1936 | Sweden ..................... 56/400.17 |
| 2091981 | 8/1982 | United Kingdom ......... 56/400.17 |

Primary Examiner—Richard T. Stouffer
Attorney, Agent, or Firm—Huebner & Worrel

[57] ABSTRACT

A work implement having a tubular handle, a tool having tines mounted within the handle for movement between an extended position and a retracted position, and a pendulum-action tool mounted on the handle.

9 Claims, 5 Drawing Figures

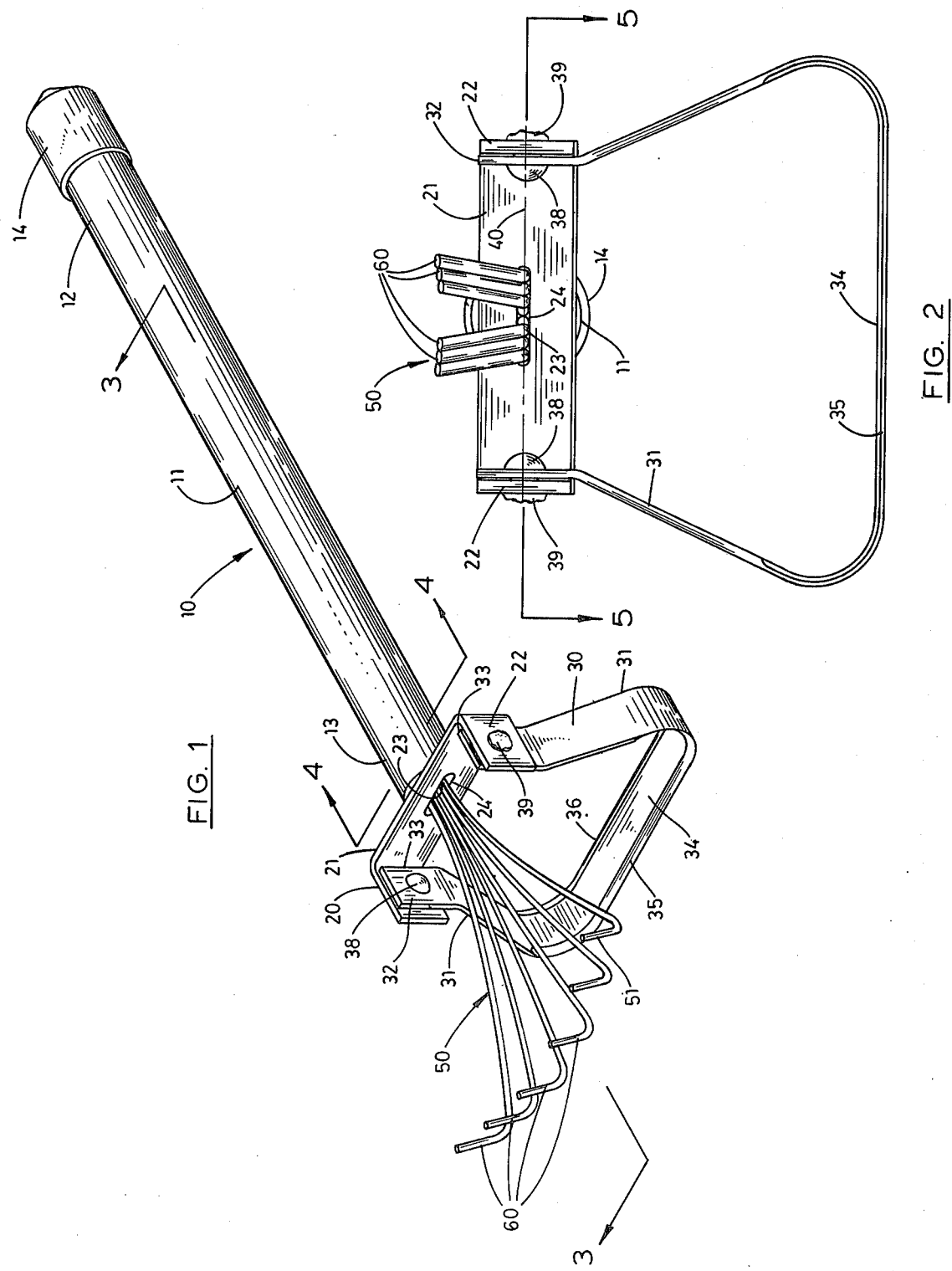

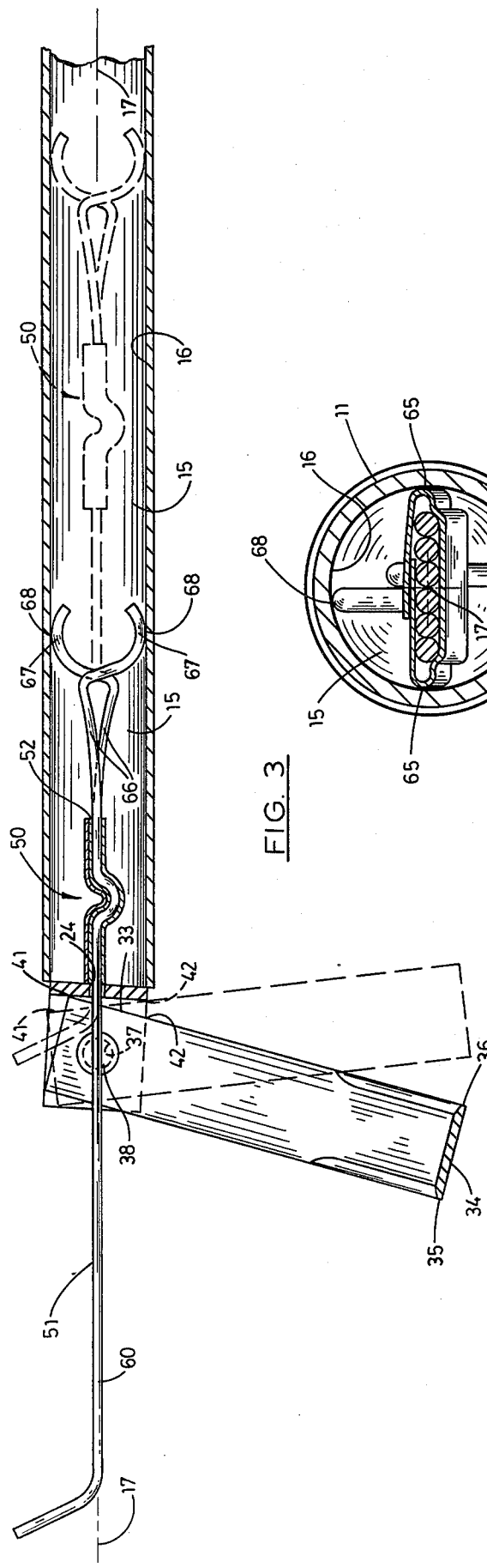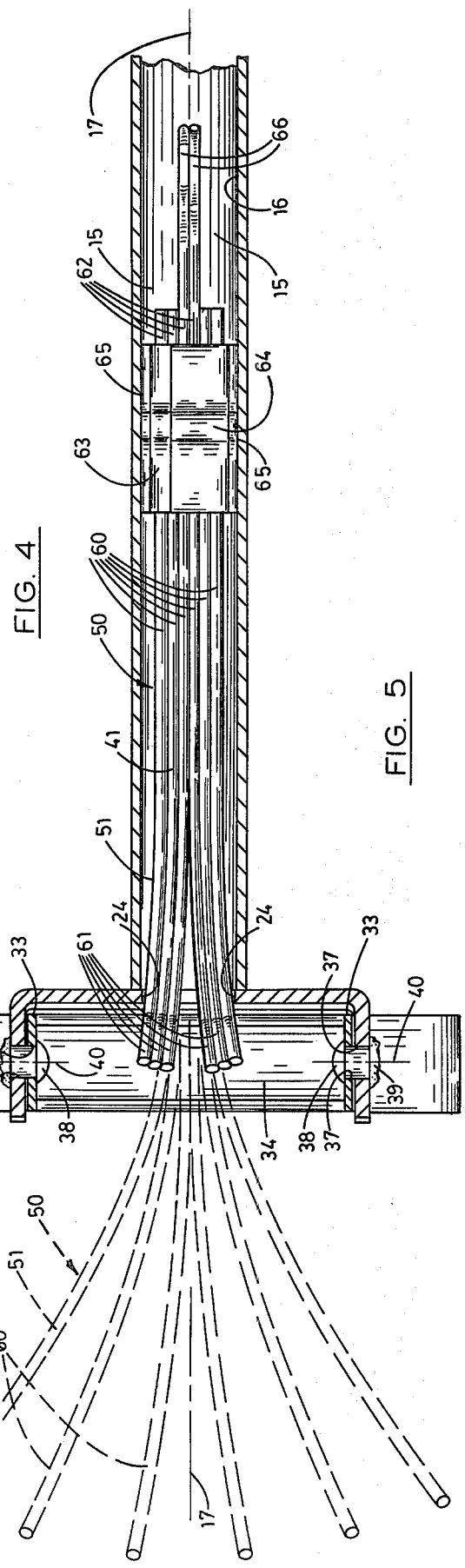

WORK IMPLEMENT

BACKGROUND OF THE INVENTION

1. Field of the Invention

The present invention relates to a work implement for use in gardening and the like and more particularly to such a work implement which is operable to perform a variety of work operations including weeding, raking, clean-up, subsurface soil cultivation and similar horticultural tasks with a facility not heretofore achieved.

2. Description of the Prior Art

The prior art is replete with tools of various types and forms of construction which can be employed to perform, with varying degrees of success, certain predesignated horticultural functions. Such tools fall into a variety of broad individual categories, such as shovels, hoes and rakes, and within each such category into a host of subcategories.

Thus, conventionally, each tool is employed to perform its predesignated function requiring that a variety of tools be maintained on hand and that they be employed in sequence. While this has been the norm, it is cumbersome, inconvenient and inefficient. Furthermore, there are a number of instances in which it would be advantageous to use a compact and versatile tool to perform the various operations required. In weeding and cultivating small planted areas such as raised planter boxes, flower beds, atria and in confined areas such as beneath spreading plants, it is very difficult if not impossible using conventional implements to reach all areas and to avoid damage to the desired plant life. As a consequence, these tasks are frequently either performed by hand, or, conversely, with a disregard for the results achieved.

Therefore, it has long been recognized that it would be desirable to have a more versatile work implement capable of performing a variety of horticultural functions in such a way as to enhance the convenience, effectiveness and dependability with which these tasks can be performed.

SUMMARY AND OBJECTS OF THE INVENTION

It is therefore an object of the present invention to provide an improved work implement useful in gardening, soil cultivation, and similar activities.

Another object is to provide such a work implement operable to perform complimentary horticultural functions.

Another object is to provide such a work implement possessing the capability of use in confined areas and with a dexterity not previously known.

Another object is to provide such a work implement having portions operable to perform discrete, but compatable functions in such a way as to cooperate with each other without in any way interfering with each other.

Another object is to provide such a work implement capable of use in performing discrete, but sequentially related horticultural operations including weeding, raking, clean-up and subsurface soil cultivation.

Another object is to provide such a work implement in which a portion thereof is movable between opposite operational positions and in movement toward one operational position operates to grasp material with which it is in contact.

Another object is to provide such a work implement in which the movable portion is stabilized in each position as well as during movement so as to be fully dependable in use.

Another object is to provide a work implement having a pivotal portion whose range of pivotal movement is determined in cooperation with another portion of the implement without requiring other mechanisms to provide such control.

Further objects and advantages are to provide improved elements and arrangements thereof in an apparatus for the purposes described which is dependable, economical, durable and fully effective in accomplishing its intended purposes.

BRIEF DESCRIPTION OF THE DRAWINGS

FIG. 1 is a perspective view of the work implement of the preferred embodiment of the present invention with the rake assembly thereof shown in an extended position.

FIG. 2 is a somewhat enlarged front elevation of the work implement with the rake assembly shown in a retracted position.

FIG. 3 is a somewhat enlarged, fragmentary, longitudinal section of the work implement taken on line 3—3 of FIG. 1 and showing the rake assembly in the extended position in full lines and in the retracted position in phantom lines.

FIG. 4 is a somewhat further enlarged transverse section of the work implement taken on line 4—4 in FIG. 1.

FIG. 5 is a fragmentary longitudinal section of the work implement taken on line 5—5 in FIG. 2 and showing the rake assembly thereof in the retracted position in full lines and in the extended position in phantom lines.

DESCRIPTION OF THE PREFERRED EMBODIMENT

Referring more particularly to the drawings, the work implement embodying the principles of the present invention is generally indicated by the numeral 10 in FIG. 1.

The work implement has a tubular handle 11 having a proximal end 12 and open distal end 13. The handle can, of course, be constructed of any suitable material, but is preferably constructed of metal or plastic. Affixed on the proximal end is a cap 14 made of rubber, plastic, or the like. As shown in FIGS. 3, 4 and 5, the handle has an interior chamber 15 bounded by a wall or surface 16 of the handle. The chamber communicates with the exterior of the handle through the distal end 13 thereof. The handle 11, chamber 15 and wall surface 16 are cylindrical and concentric to a longitudinal axis 17.

The distal end 13 has a metal mount or end piece 20 secured thereon and extending across the open distal end of the handle. The end piece has a flat plate or cross portion 21 mounted on the handle. The cross portion is disposed in substantially right angular relation to the longitudinal axis 17 of the handle, as best shown in FIG. 5, but is tilted slightly with respect to said longitudinal axis as can best be seen in FIG. 3. Where the handle is constructed of metal, the cross portion of the end piece is preferably welded to the open distal end of the handle. If the handle is constructed of another material such as plastic, the end piece may be mounted on the handle by using a sleeve welded to the cross portion which is itself riveted or pinned on the handle.

The end piece 20 has a pair of arms 22 integral with and extending from the cross portion in spaced, substantially parallel relation to each other and normal to the cross portion. A hole or aperture 23 having a slotted configuration is extended through the cross portion substantially normal to the longitudinal axis 17 of the handle 11, as best shown in FIGS. 1 and 2, and communicating with the internal chamber 15 thereof. The cross portion has edges 24 which bound and thereby define the aperture.

As can perhaps best be seen in FIG. 1, the work implement 10 has a substantially U-shaped cultivating tool 30 mounted on the end piece 20 thereof. The cultivating tool is mounted in depending, substantially perpendicular relation to the longitudinal axis 17 of the handle on the arms 22 of the end piece 20, as will hereinafter be described. The cultivating tool is preferably formed from a single, flat piece of metal bent to form side sections 31 having spaced, substantially parallel free ends 32. The free ends have lateral edges 33 which face the cross portion 21 of the end piece 20, as can best be seen in FIGS. 3 and 5. The cultivating tool has a flat central section 34 with a sharpened or beveled leading edge 35 and trailing edge 36. As can best be seen in FIG. 3, the leading and trailing edges are preferably, although not necessarily, beveled or sharpened on their upper sides. The free ends 32 of the cultivating tool and the arms 22 of the end piece have matching holes 37 extended therethrough. Headed pins 38 are individually extended through the corresponding holes 37 of the arm 22 and free end 32 on each side of the end piece 20. Preferably the non-headed end of each pin is secured on its respective arm by a weld 39 formed on the outer surface of each arm to secure the free ends of the cultivating tool on their respective arms with the heads of the pins positioned inwardly of their respective arms and free ends and spaced therefrom so that the free ends, and thus the cultivating tool, are pivotal about the pins about an axis 40 normal to the longitudinal axis 17 of the handle 11.

As best shown in FIG. 3, the lateral edges 33 of the free ends 32 have corresponding upper contact points 41 and lower contact points 42. The contact points are so designated in that the upper contact points 41 contact the cross portion 21 of the end piece 20 when the cultivating tool 30 is pivoted about the axis of the pins 40 to the position shown in full lines in FIG. 3. Conversely, the lower contact points 42 contact the cross portion 21 of the end piece 20 when the cultivating tool is pivoted about the axis of the pins 40 to the position shown in phantom lines in FIG. 3. Thus, the range of pivotal movement of the cultivating tool is determined by the position of the axis of the pins 40 and the distance of the contact points from the cross portion of the end piece 20.

As can be best seen in FIGS. 1, 3 and 5, the work implement 10 has a rake or tined tool 50 slidably mounted within the chamber 15 of the handle 11. Upon reference to FIG. 3, it will be seen that the tined tool has a distal or work section 51 and a proximal or mounting section 52. The work section extends through the aperture 23 of the end piece 20 and is slidable within the confines of the edges 24. The work section is slidable between a retracted position, shown in full lines in FIGS. 2 and 5 and in phantom lines in FIG. 3, and an extended position shown in full lines in FIGS. 1 and 3 and in phantom lines in FIG. 5. As is evident upon reference to these views, the work section in the retracted position is substantially contained within the handle and in the extended position is substantially external of the handle.

The tined tool 50 has a plurality of tines 60 having distal end portions 61 which are flexed or bent obliquely in a direction opposite to that in which the cultivating tool 30 extends, as best shown in FIG. 3. The tines have opposite proximal end portions 62. In the extended position, the distal end portions of the tines 60 radiate away from the longitudinal axis, as best shown in FIG. 5, substantially equidistant from each other and in a common plane. The tines are maintained in said planar relation and the work section is stabilized against rotation about the longitudinal axis 17 of the handle 11 by engagement with the edges 24 bounding the aperture 23. When the tined tool is moved from the extended position toward the retracted position within the handle chamber 15, the distal end portions of the tines are brought into juxtaposition as shown in FIGS. 2 and 5 by contact between the tines farthest from the longitudinal axis 17 and the edges 24.

As shown in FIGS. 3, 4 and 5, the tines 60 are mounted in fixed position relative to each other to form the mounting section 52 of the tined tool 50 by a band 63 wrapped about the proximal end portions 62 of the tines and crimped thereupon in such a way as to form a crimp or bent portion 64. The bent portion captures the tines in fixed position relative to each other so as to prevent their being displaced endwardly relative to each other. The metal band is sized for slidable contact with the chamber surface 16 of the handle 11 at contact lines or points 65 which define a plane substantially coplanar with the longitudinal axis 17 of the handle. This relationship is best shown in FIG. 4. Two of the tines 60 have extended portions 66 which extend beyond the metal band 63 to the right as viewed in FIG. 3. The extended portions 66 have resilient curved portions 67 which contact the chamber surface 16 at contact points 68. As can be seen in FIG. 4, the contact points 68 are slightly off-set relative to each other but define a plane which is nearly right angularly related to the plane defined by the contact points 65. The planes of contact points 65 and 68 intersect substantially along the longitudinal axis 17 of the handle, as best shown in FIG. 4. The engagement of the contact points 65 and 68 with the chamber surface 16 provides support for the mounting section 52 of the tined tool.

OPERATION

The operation of the described embodiment of the work implement 10 is believed to be clearly apparent and is briefly summarized at this point.

For use as a soil cultivating tool in the manner of a pendulum-action hoe, the work implement 10 is grasped by the operator using the handle 11 with the cultivating tool 30 directed toward the soil. The tool is forced partially beneath the surface of the soil to a desired depth and is brought into working operation by back-forth movement of the handle. Movement of the handle from the operator causes the cultivating tool to be pivoted in a counterclockwise direction, as viewed in FIG. 3 to the position shown therein in phantom lines. This positions the leading edge for slicing movement through the soil and foliage. The lateral edges 33 of the free ends 32 engage the cross portion 21 of the end piece 20 at the lower contact points 42 to retain the cultivating tool in the position shown in phantom lines in FIG. 3.

Similarly, movement of the handle 11 toward the operator results in pivotal movement of the cultivating tool 30 in a clockwise direction, as viewed in FIG. 3 until the cultivating tool reaches the position shown in full lines in FIG. 3, as determined by engagement of the lateral edges 33 with the cross portion 21 of the end piece 20 at upper contact points 41. This causes the trailing edge 36 of the cultivating tool to be deployed for slicing use. A repetition of this back-and-forth motion of the tool allows for cultivation of subsurface soil and cutting of undesired underground growth without disturbing valuable topsoil.

When using the tined tool 50, the handle 11 is once again grasped by the operator, but is held in a position rotated 180° about the longitudinal axis 17 of the handle from the position in which the cultivating tool 30 is employed. The tined tool is moved to the extended position by pulling one or more of the tines 60 away from the handle to the position shown in full lines in FIGS. 1 and 3. As noted, however, the work implement 10 is inverted from the position shown in these views. The tined tool is employed by the operator in the manner of a rake for grooming or clearing the soil surface of weeds or the like which may have been severed using the cultivating tool. The tined tool 50 is moved to the retracted position by grasping the tines manually and pushing them into the handle. Alternately, the tined tool can be retracted by contacting a solid surface with the work ends 61 of the tines and moving the handle 11 toward the solid surface, thus forcing the tines into the handle. As previously discussed, movement of the tines 60 to the retracted position causes the tines to be brought into engagement with each other, as shown in FIGS. 2 and 5. This permits the grasping of material between the tines. In this manner, the tined tool can be used to pick up, for example, weeds or leaves which may have been raked into a pile using the tined tool 50.

The work implement 10 of the present invention thus can be employed to perform a variety of horticultural, agricultural, and cultivating functions. Used in the manner of a hoe, it is highly effective for aerating, weeding, and otherwise cultivating subsurface soil with a minimum of molestation or disturbance of valuable topsoil. When used in the manner of a rake, the work implement can be used to groom soil surfaces previously cultivated by the cultivating tool and for clearing vegetation uprooted thereby. Similarly, the work implement is operable to pick up material including refuse such as weeds, leaves and the like.

Therefore, the work implement of the present invention is an extremely versatile tool capable of performing a wide variety of horticultural functions and in sequence without the aid of other tools permitting the operator to perform these functions in confined areas and without having to change positions to get other tools, the tool being characterized by a simple and yet extremely durable and dependable structure.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. A work implement comprising a handle having a longitudinal axis, an internal chamber bounded by a wall and an open end; a tool having a distal section and a proximal section mounted within the chamber of the handle for movement between a retracted position wherein the proximal and distal sections of the tool are substantially contained within the chamber and an extended position wherein a substantial portion of the distal section is extended through said open end of the handle externally of the chamber, said distal section of the tool having a plurality of tines with proximal portions mounted in juxtaposition with respect to each other within the chamber of the handle and opposite distal portions radiating substantially equidistant from each other when the tool is in said extended position and constrained in substantially side-by-side relation by engagement with the handle when the tool is in said retracted position; means for stabilizing the tool against rotation about the longitudinal axis of the handle; and means for supporting the proximal section of the tool within the chamber of the handle, said supporting means including a band wrapped about and binding the proximal portions of the tines within the chamber and contacting substantially opposing points on said wall of the chamber, the opposing points being aligned in substantially coplanar relation to the longitudinal axis of the handle, and said supporting means further including a portion of the tool extended in the opposite direction from the band from the distal portions of the tines and contacting the wall of the chamber at second points of contact substantially aligned in a plane substantially normal to the plane of said points of contact of the band and spaced therefrom along the longitudinal axis of the handle.

2. A work implement comprising:
   A. a tubular handle having a longitudinal axis, an inner surface and an end opening;
   B. an end piece affixed on the handle in covering relation to the end opening and having edges bounding and thereby defining an aperture oriented substantially transversely of the longitudinal axis of the handle;
   C. a tool, having a plurality of tines, mounted within the handle for movement from a retracted position in which the tines are substantially contained within the handle and an extended position in which the tines are extended from the handle through said aperture of the end piece and deployed for use, and a pair of said tines extending within the handle in a direction away from the end piece and contacting said inner surface of the handle at points aligned in a plane substantially normal to the longitudinal axis of the handle and substantially normal to the aperture of the end piece; and
   D. a substantially rigid band affixed on and binding the tines together within the handle and contacting the inner surface of the handle at points spaced from the points of contact of said pair of tines and defining a plane substantially right-angularly related to the plane defined by the points of contact of said pair of tines.

3. The work implement of claim 2 wherein the end piece mounts a second tool in a position such as not to obstruct movement of the first tool between said retracted and extended positions.

4. The work implement of claim 3 wherein said tines of the first tool have work end portions which extend generally in one direction and the second tool extends generally in a direction opposite thereto.

5. The work implement of claim 4 wherein at least two of the work end portions of the tines are urged toward engagement with each other during said movement of the tool from the extended position toward the retracted position whereby when the tool is in said extended position force applied on the handle in the direction of the work end portions of the tines when said work end portions are in contact with objects to be retrieved causes the tool to be moved toward the retracted position and said objects to be grasped by said work end portions.

6. The work implement of claim 2 wherein the end piece mounts a pair of arms extending therefrom in spaced, substantially parallel relation on opposite sides of said aperture and a return bent, pendulum-action tool is mounted for substantially pivotal movement on said arms about an axis substantially normal to the longitudinal axis of the handle, in a position such that corresponding points of contact on the pendulum-action tool are brought into contact with the end piece during said pivotal movement in one direction to limit movement in said direction and corresponding second points of contact on the pendulum-action tool are brought into contact with the end piece during said pivotal movement in an opposite direction to limit movement in said opposite direction.

7. The work implement of claim 6 wherein the pendulum-action tool has a side blade portion and a pair of mounting ends individually mounted on the arms of the end piece for movement substantially about said axis and said mounting ends have corresponding lateral edges individually facing the end piece and having said points of contact and said points of contact being positioned relative to the end piece to define a range of movement for the pendulum-action tool about said axis by engagement of said points of contact with the end piece.

8. A work implement comprising a handle having an end portion; a plate mounted on said end portion having a contact portion defining a substantially flat plane substantially normal to the handle and facing substantially endwardly from said end portion of the handle and a pair of arms disposed in spaced relation; and a pendulum-action tool having a pair of mounting ends individually mounted on said arms of the plate for substantially pivotal movement substantially about an axis substantially parallel to the contact portion of the plate, said mounting ends having corresponding lateral edges facing the contact portion of the plate and positioned relative thereto so that contact of said lateral edges with the contact portion of the plate during said substantially pivotal movement of the tool defines a range therefor.

9. A work implement comprising a handle having an internal chamber bounded by a wall and the chamber communicating with the exterior of the handle through an opening; a tool mounted within the chamber of the handle for movement between a retracted position substantially contained within the handle and an extended position in which said tool is disposed for use and wherein the tool has a plurality of tines which, when the tool is disposed in the extended position, resiliently radiate laterally from each other such that when the tines are placed in endward engagement with material to be retrieved and upon movement of the handle endwardly toward said material to be retrieved, the tines are moved toward the retracted position and simultaneously toward each other to capture said material between adjacent tines for retrieval using the handle; first means borne by the tool within said chamber having portions disposed in slidable contact with the wall for guiding the tool in movement between said retracted and extended positions; and a pair of juxtaposed tines borne by the tool within the chamber in spaced relation to the first means and extending in the opposite direction relative to the first means from the opening of the handle and biased resiliently in opposite directions to engage the wall of the handle in slidable contact for guiding the tool in said movement between said retracted and extended positions.

* * * * *